(12) United States Patent
Horii et al.

(10) Patent No.: US 11,619,986 B2
(45) Date of Patent: Apr. 4, 2023

(54) VIRTUAL REALITY CONTROLLER APPARATUS

(71) Applicant: HEWLETT-PACKARD DEVELOPMENT COMPANY, L.P., Spring, TX (US)

(72) Inventors: Hiroshi Horii, Palo Alto, CA (US); Kevin Smathers, Palo Alto, CA (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/052,149

(22) PCT Filed: Oct. 18, 2018

(86) PCT No.: PCT/US2018/056462
§ 371 (c)(1),
(2) Date: Oct. 30, 2020

(87) PCT Pub. No.: WO2020/081081
PCT Pub. Date: Apr. 23, 2020

(65) Prior Publication Data
US 2021/0365106 A1 Nov. 25, 2021

(51) Int. Cl.
*G06F 3/01* (2006.01)
*G06F 3/023* (2006.01)
*G06F 3/0338* (2013.01)

(52) U.S. Cl.
CPC .............. *G06F 3/011* (2013.01); *G06F 3/023* (2013.01); *G06F 3/0338* (2013.01)

(58) Field of Classification Search
CPC .......... G06F 3/011; G06F 3/023; G06F 3/0338
See application file for complete search history.

(56) References Cited

U.S. PATENT DOCUMENTS 5,565,887 A * 10/1996 McCambridge .... G06F 3/04892
345/157
5,724,068 A   3/1998 Sanchez
5,764,164 A   6/1998 Cartabiano et al.
(Continued)

OTHER PUBLICATIONS

Henk G. Kortier, et al., Sensors 2016, 16, 2005, pp. 1-17.
(Continued)

*Primary Examiner* — Ariel A Balaoing
(74) *Attorney, Agent, or Firm* — Quarles & Brady LLP

(57) ABSTRACT

Example virtual reality controller apparatus are disclosed herein. An example controller for use with a virtual reality device implementing a virtual reality environment includes a base and a shaft supported by the base. The shaft includes a first control button associated with a first axis of a coordinate plane. The first control button is in communication with the virtual reality device. Activation of the first control button is to cause restriction of movement a virtual object in the virtual reality environment relative to the first axis. The shaft includes a second control button associated with a second axis of the coordinate plane. The second control button is in communication with the virtual reality device. Activation of the second control button is to cause restriction of movement of the virtual object in the virtual reality environment relative to the second axis.

15 Claims, 8 Drawing Sheets

(56) References Cited

U.S. PATENT DOCUMENTS

| | | | |
|---|---|---|---|
| 5,905,487 A | 5/1999 | Kwon | |
| 5,982,356 A | 11/1999 | Akiyama | |
| 6,184,868 B1 * | 2/2001 | Shahoian | G06F 3/03545 345/161 |
| 6,198,471 B1 | 3/2001 | Cook | |
| 7,802,193 B1 | 9/2010 | McDonald et al. | |
| 9,020,644 B2 | 4/2015 | Greeley et al. | |
| 2001/0000663 A1 | 5/2001 | Shahoian | |
| 2002/0171625 A1 * | 11/2002 | Rothchild | G06F 3/03549 345/156 |
| 2002/0196232 A1 * | 12/2002 | Chen | G05G 5/05 345/161 |
| 2008/0051255 A1 * | 2/2008 | Ringer | A01M 7/0089 74/335 |
| 2011/0219899 A1 * | 9/2011 | Dize | G05G 9/047 74/471 XY |
| 2014/0094310 A1 * | 4/2014 | Bleich | G07F 17/3209 463/38 |
| 2016/0306422 A1 | 10/2016 | Parham et al. | |
| 2019/0201784 A1 * | 7/2019 | Holz | G06F 3/0338 |
| 2020/0289228 A1 * | 9/2020 | Denlinger | A61B 17/29 |

OTHER PUBLICATIONS

Microsoft blog editor, "Touching the Virtual: How Microsoft Research is Making Virtual Reality Tangible", https://www.microsoft.com/en-us/research/blog/touching-virtual-microsoft-research-making-virtual-reality-tangible/, printed Aug. 17, 2018, 10 pages.

* cited by examiner

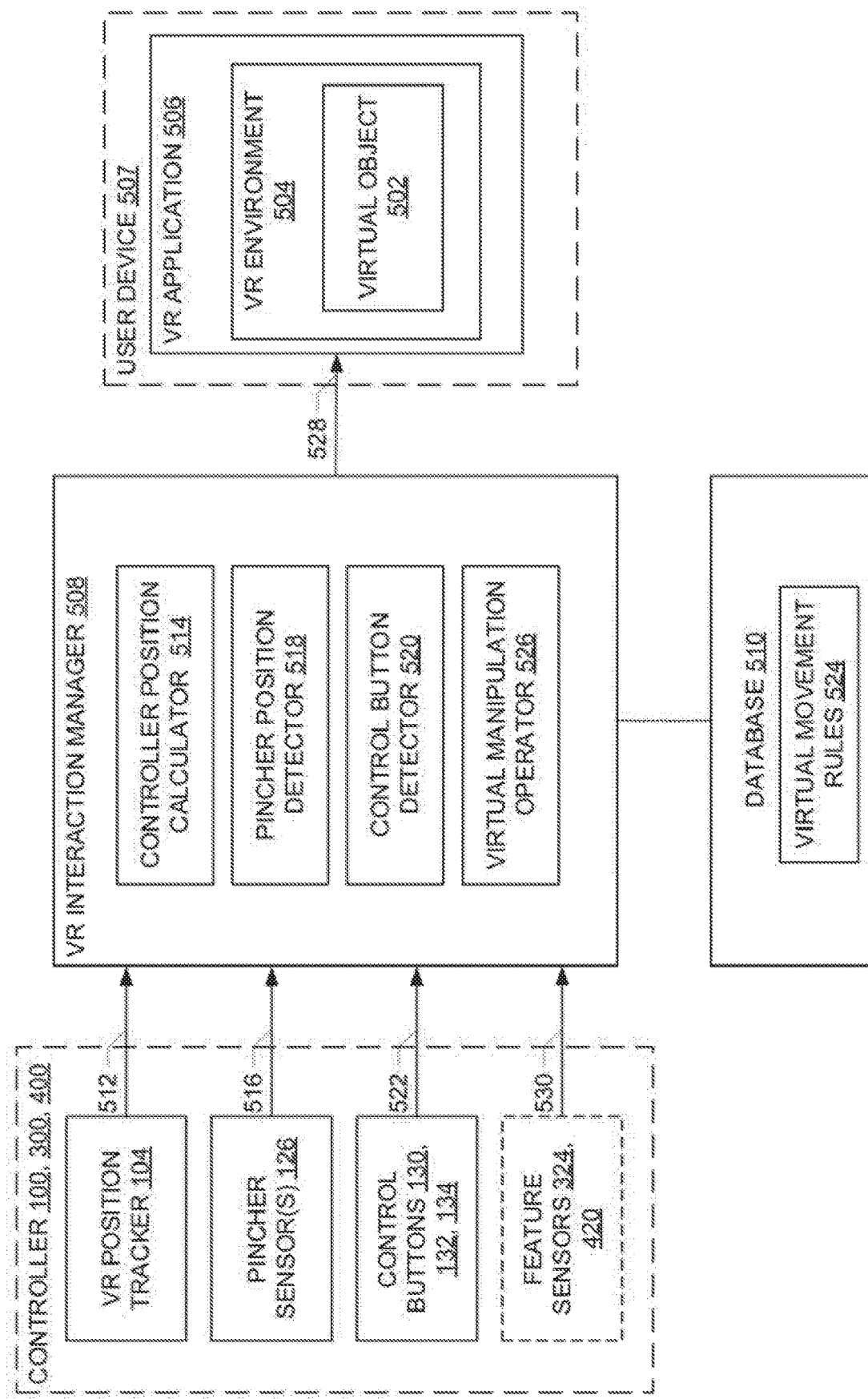

VIRTUAL REALITY CONTROLLER APPARATUS

BACKGROUND

Hand-held virtual reality (VR) controllers are used to manipulate virtual content in a VR environment. Manipulation of virtual content using a VR controller can include moving a virtual object from a first position to a second position in the VR environment via corresponding movement of the VR controller.

BRIEF DESCRIPTION OF THE DRAWINGS

FIG. 5 is a block diagram of an example system for manipulating a virtual object in a virtual reality environment using any of the example controllers of FIGS. 1A-4 and including an example virtual reality interaction manager in accordance with teachings of this disclosure.

Figure 1A:
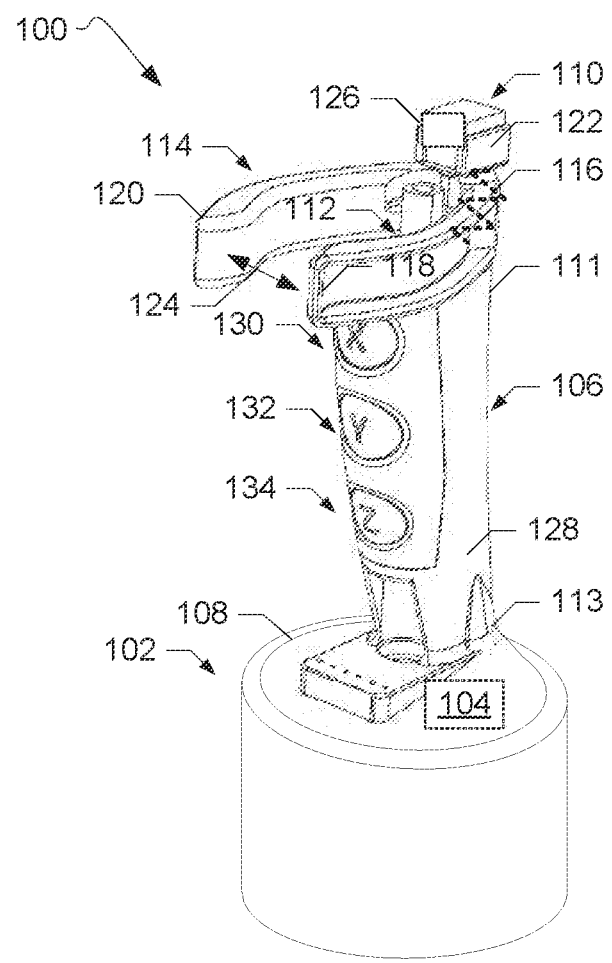
FIG. 1A illustrates an example controller in accordance with teachings of this disclosure.

The figures are not to scale. Wherever possible, the same reference numbers will be used throughout the drawings and accompanying written description to refer to the same or like parts. While the drawings illustrate examples of printers, other examples may be employed to implement the examples disclosed herein.

DETAILED DESCRIPTION

Disclosed herein are example hand-operated virtual reality (VR) controllers for use with user devices presenting a VR environment, such as goggles, a headset, or a computer. Example controllers disclosed herein include a pincher or claw that can be controlled by the user's fingers to mimic grabbing and/or holding a virtual object in the VR environment. Example controllers disclosed herein include control buttons that can be selected by the user to restrict, limit, or otherwise control movement of the virtual object along a coordinate axis or multiple coordinate axes (e.g., x-, y-, z-axes) or planes (e.g., x-y plane) in the VR environment. As a result of selecting a particular control button (or a combination of buttons), the virtual object moves in the virtual environment along the selected axis or plane and not along other axes or planes despite, for instance, unsteady movement of the users hand while holding and/or moving the VR controller that would otherwise result in at least some movement of the virtual object along other axes or planes.

Some hand-operated VR controllers include design features associated with controllers used for video games such as joysticks, gun triggers, etc. However, user motions in operating a gun trigger or joystick do not mimic natural motions such as picking up an object and moving the object as would be performed in real life. As VR applications expand from use beyond gaming and into professional use such as engineering design applications, the ability for a user to mimic natural movements such as holding a virtual pen and drawing a straight line while interacting with the VR application can improve the user's experience with the VR application. However, as a user moves (e.g., drags) the VR controller to, for instance, move the virtual pen from a first position to a second position to draw the line, the user's hand and/or arm may unintentionally shake due to, for instance, muscle fatigue. Such unintentional, but often natural, wavering or shakiness in the user's movements while holding the controller can result in unintended or imprecise control of the virtual object in the VR environment. For example, a line drawn using a virtual pen can appear jagged as a result of up-and-down movement of the user's arm while dragging the VR controller and corresponding detection and translation of such movement in the VR environment.

Example VR controllers and related systems disclosed herein enable a user to manipulate virtual objects using movements that mimic natural motions in the real world. For instance, some example VR controllers include a pincher or claw that allows the user to mimic a grasping motion by squeezing fingers of the pincher. Some example VR controllers allow the user to freely move his or her hand or arm while holding the VR controller to perform dragging motions, lifting motions, etc. to manipulate the virtual object in the VR environment. Some example controllers disclosed herein can be operated by the user using one hand, thereby further increasing the user's comfort and range of freedom while interacting with the VR application.

Examples disclosed herein address unsteadiness in user movement, such as hand wavering, as the user moves the VR controller to provide for precise movement and control of the virtual object in the VR environment. Some example VR controllers disclosed herein include control buttons that can be selected by the user to restrict movement of the virtual object along a particular axis (e.g., x-, y, or z-axis) or within a plane (e.g., an x-y plane) in the VR environment. When such control buttons are selected by the user, a VR interaction manager in communication with the VR controller adjusts or restricts position data received from the VR controller that conflict with the selected axis or plane of movement. Therefore, the resulting movement of the virtual object in the VR environment is restricted to movement along the selected axis or plane and data associated with, for instance, unintentional user movements such as hand shaking does not affect the output in the VR environment.

Although example controllers disclosed herein are discussed in the context of virtual reality applications, teachings disclosed herein can be used in connection with other software applications such as augmented reality and gaming as well as other applications such as robotic operations including, for instance, robotic medical devices, etc. As such, the discussion of virtual reality is for illustrative purposes and does not limit this disclosure to virtual reality applications.

FIG. 1A illustrates an example controller 100 in accordance with teachings of this disclosure. As discussed herein, the example controller 100 of FIG. 1A enables a user to interact with a VR application implemented via user device such as a computer, a headset, etc. The example VR controller 100 of FIG. 1A includes an example base 102. The base 102 allows the VR controller 100 to rest upright on a surface such as, for example, a table or desk. The example VR controller of FIG. 1A includes an example VR position tracker 104. The VR position tracker 104 includes a sensor to detect a position and/or orientation of the controller 100 as the user holds the controller 100 in his hand relative to a coordinate system (e.g., an x-y-z coordinate system). The sensor of the VR position tracker 104 can include a position sensor (e.g., a potentiometer), an infrared sensor, a motion sensor, etc. The sensor of the VR position tracker 104 tracks changes in controller position and/or orientation as the user moves his or her arm while holding the controller 100. The VR position tracker 104 is in communication with an example VR interaction manager (FIG. 5) and transmits position data to the VR interaction manager, which uses the data to control manipulation of a virtual object. In the example of FIG. 1A, the VR position tracker 104 is coupled to the base 102 of the controller 100. The VR position tracker 104 can be disposed in a portion of the base 102 and/or coupled to, for instance, a surface of the base 102 that faces a surface on which the base 102 rests. However, the VR position tracker 104 can be coupled to other portions of the controller 100 than the base 102.

The example controller 100 includes an example shaft 106 extending from an end 108 of the base 102. Although in the example of FIG. 1A, the shaft 106 is substantially straight, the shaft 106 can have other shapes, such as, for example, a curved profile. An example pincher 110 is coupled to an end 111 of the shaft 106 opposite an end 113 of the shaft 106 coupled to the base 102. The example pincher 110 includes an example first protrusion 112 and an example second protrusion 114. The first and second protrusions 112, 114 are biased by an example biasing element such as, for example, a spring 116 such that in a resting position, an end 118 of the first protrusion 112 is spaced part from an end 120 of the second protrusion 114 as illustrated in FIG. 1A. The first and second protrusions 112, 114 of the pincher 110 are rotatably coupled about a pivot 122 such that the respective ends 118, 120 of the protrusions 112, 114 move toward one another as represented by arrow 124 of FIG. 1A.

Figure 2:
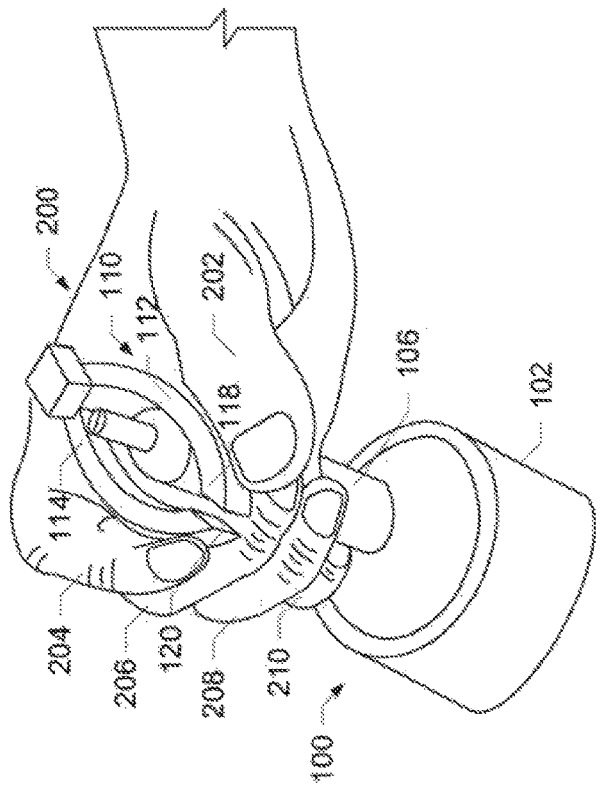
FIG. 2 illustrates the example controller of FIG. 1A during operation by a user.

The example pincher 110 includes an example rotational sensor 126 such as, for example, a rotary potentiometer. In use, the rotational sensor 126 measures an angle of the protrusions 112, 114 relative to, for instance, the shaft 106, as the protrusions 112, 114 are squeezed by a user (FIG. 2). The rotational sensor 126 is in communication with the VR interaction manager (FIG. 5) and transmits angular position data to the VR interaction manager. Based on the angular position data generated by the rotational sensor 126 indicating that the angle between the protrusion 112, 114 has decreased, the VR interaction manager determines that the user wishes to grasp a virtual object in the VR environment. Likewise, based on the angular position data generated by the rotational sensor 126 indicating that the angle between the protrusion 112, 114 has increased, the VR interaction manager determines that the user wishes to loosen a grasp of or release a grasped virtual object in the VR environment. The example controller 100 can include two or more rotational sensors.

The shaft 106 of the example controller 100 of FIG. 1A includes example control buttons coupled to an exterior surface 128 of the shaft 106. In the example of FIG. 1A, the controller 100 includes an example first control button 130, an example second control button 132, and an example third control button 134. The controller 100 can include additional buttons or fewer buttons than shown in FIG. 1A. In the example of FIG. 1A, the control buttons 130, 132, 134 are disposed along an axis of the shaft 106 in a substantially linear arrangement. However, other arrangements of the control buttons 130, 132, 134 relative to the shaft 106 are possible. The control buttons 130, 132, 134 can include spring-loaded buttons, touch-activated buttons, etc. As disclosed herein, activation of any of the buttons results in controlled or restricted movement of a virtual object in a VR environment relative to a coordinate system. Sensor data indicating that the respective control buttons 130, 132, 134 have been activated is transmitted to the VR interaction manager (FIG. 5), which analyzes the data to control the movement of the virtual object.

Figure 1B:
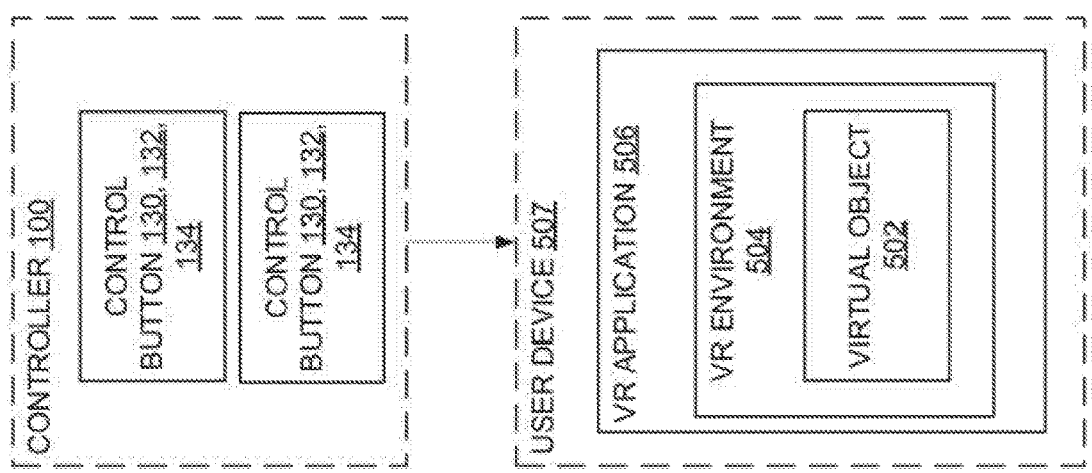
FIG. 1B is a block diagram of the example controller of FIG. 1A for use with a virtual reality environment in accordance with teachings of this disclosure.

FIG. 1B is a block diagram illustrating the example controller 100 of FIG. 1A for use with a virtual reality environment 506 associated with a virtual reality application 506 implemented by a user device 507 (e.g., a virtual reality device). The user device 507 can include a personal computer, a headset, goggles, a smartphone, etc. The example controller 100 includes a first control button 130, 132, 134 in communication with the user device 507. The controller 100 is in communication with the user device 507 via wired or wireless connection(s). In the example of FIG. 1B, the first control button 130, 132, 134 is associated with a first axis (e.g., an x-axis) of a coordinate plane (e.g., an x-y-z plane). In the example of FIG. 18, activation of the first control button 130, 132, 134 is to cause restriction of movement a virtual object 502 in the virtual reality environment 504 relative to the first axis.

As shown in FIG. 18, the controller 100 includes a second control button 130, 132, 134 in communication with the user device 507. The second control button 130, 132, 134 is associated with a second axis (e.g., a y-axis) of the coordinate plane. In the example of FIG. 1B, activation of the second control button 130, 132, 134 is to cause restriction of movement of the virtual object in the virtual reality environment relative to the second axis. In some examples, the controller 100 includes a third control button 130, 132, 134 in communication with the user device 507. Activation of the third control button is to cause restriction of movement of the virtual object in the virtual reality environment relative to a third axis (e.g., the z-axis).

FIG. 2 illustrates the example controller 100 of FIG. 1A in use by a user. As shown in FIG. 2, the user holds the controller 100 by wrapping his or her hand 200 about the shaft 106 of the controller such that the user thumb 202 and pointer finger 204 engage the respective protrusions 112, 114 of the pincher 110 and the middle, ring, and pinky fingers 206, 208, 210 of the user's hand 200 engage the respective control buttons 130, 132, 134 of the shaft 106 (FIG. 1A). As shown in FIGS. 1A and 2, the longitudinal arrangement of the control buttons 130, 132, 134 along the surface 128 of the shaft 106 enables the user to simultaneously engage the control buttons 130, 132, 134. In some examples, a size of a circumference of the shaft 106 is selected to allow the user to wrap his or her hand about the shaft 106 with his or her fingers resting on the control buttons 130, 132, 134 without straining his or her fingers to reach the control buttons 130, 132, 134.

The example controller 100 can be made of materials such as plastics. In some examples, the portions of the controller 100 that are engaged by user, such as the protrusions 112, 114 and the shaft 106 include coatings to increase a user's grip and reduce sliding of the controller 100 from the user's hand. Portion(s) of the controller 100 can include, for instance, cushioning material to increase user comfort when holding the controller 100.

In some examples, the user may lift or partially lift the base 102 and, thus, the controller 100 from a surface on which the controller 100 rests. In some examples, the base 102 is not resting on a surface while held by the user. The user can tilt the controller 100 via the shaft 106 and the base 102 when manipulating a virtual object.

As shown in FIG. 2, the first and second protrusions 112, 114 can be squeezed by the users thumb 202 and pointer finger 204 such that the ends 118, 120 of the protrusions 112, 114 move toward one another. During an interaction with a VR application, the user squeezes the protrusions 112, 114 to grasp a virtual object in the VR environment and to hold the virtual object during movement of the virtual object via the controller 100. The force from pushing of the protrusions 112, 114 against the spring 116 (FIG. 1A) as the user squeezes the protrusions 112, 114 provides the user with the sensation that the user is grasping an object in the real world. In some examples, the protrusions 112, 114 include tactile sensors or linear actuators to further provide haptic feedback to the user when, for example, the respective ends 118, 120 of the protrusions 112, 114 touch.

As shown in FIGS. 1A and 2, while the user is squeezing the protrusions 112, 114 of the pincher 110, the user can engage the control buttons 130, 132, 134 (e.g., one of the control buttons 130,132, 134; two of the buttons 130, 132, 134), which results in restricted movement of the virtual object relative to an axis or plane in a coordinate system. Thus, the example controller 100 can be operated via one hand, including lifting the base 102 from a surface, titling the controller 100, squeezing the protrusions 112, 114, pressing the control buttons 130, 132, 134, etc.

Figure 3:
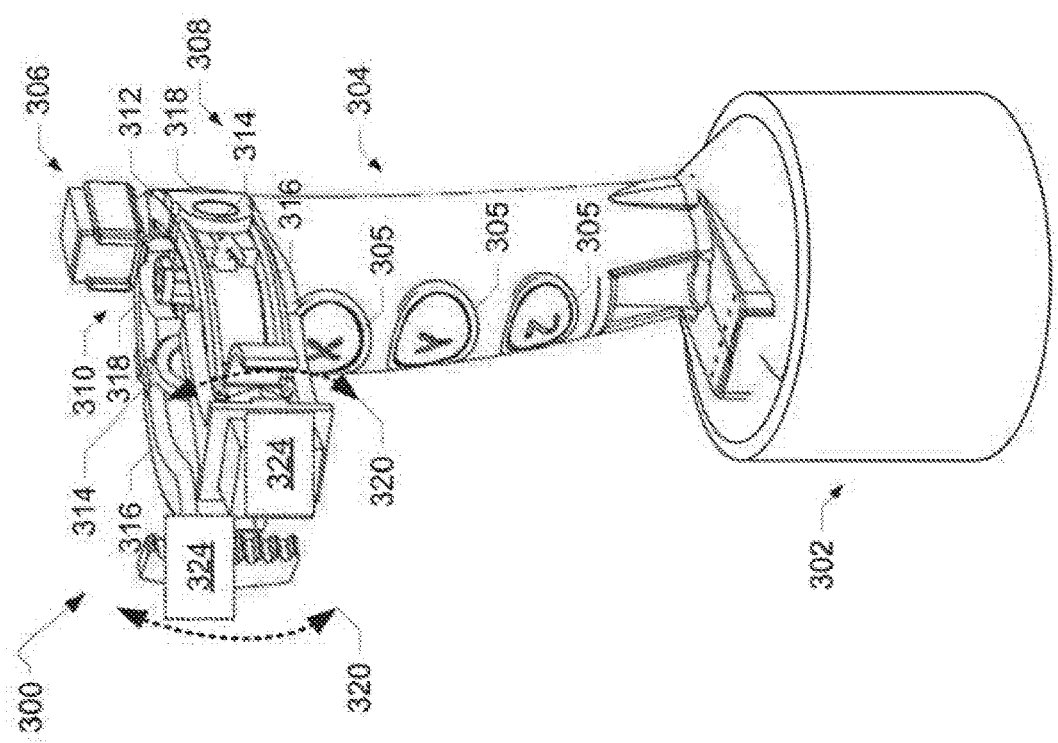
FIG. 3 illustrates another example controller in accordance with teachings of this disclosure.

FIG. 3 illustrates a second example controller 300 in accordance with teachings of this disclosure. The example controller 300 of FIG. 3 is substantially similar to the example controller 100 of FIG. 1A including a base 302, a shaft 304 including control buttons 305 (e.g., the control buttons 130, 132, 134 of FIG. 1A), and a pincher 306 including protrusions 308, 310. The description of similar features of FIG. 1A apply to the features of FIG. 3. The protrusions 308, 310 rotate about a pivot 312 as a user moves (e.g., presses or squeezes) the protrusions 308, 310 toward one another. In the example controller 300 of FIG. 3, each of the protrusions 308, 310 includes an example articulating joint 314. The articulating joint 314 is coupled between a first portion 316 and a second portion 318 of the respective protrusions 308, 310. In use, the user can twist the respective protrusions 308, 310 via the articulating joints 314 as represented by the arrows 319, 320 of FIG. 3. The twisting motion can be performed to, for example, rotate or partially rotate a virtual object in an VR environment. Respective ends 322 of the protrusions 308, 310 include a rotary encoder 324 to detect the twisting motion and generate data for transmission to the VR interaction manager (FIG. 5) with respect to manipulation of the virtual object.

Figure 4:
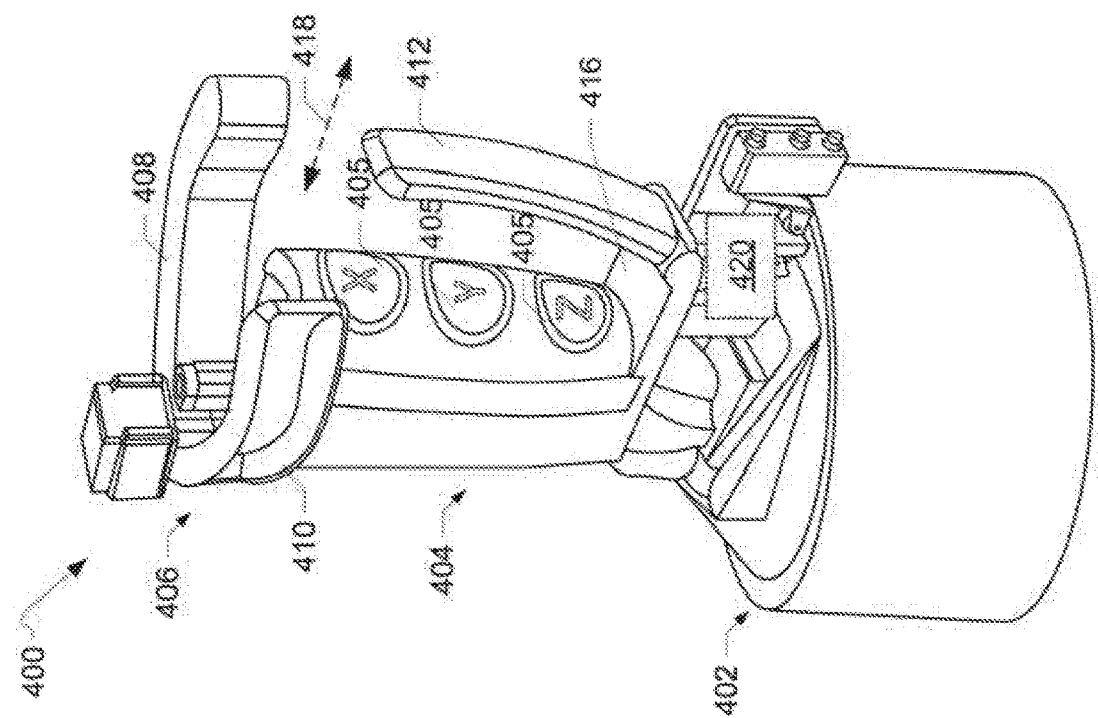
FIG. 4 illustrates another example controller in accordance with teachings of this disclosure.

FIG. 4 illustrates a third example controller 400 in accordance with teachings of this disclosure. The example controller 400 of FIG. 4 is substantially similar to the example controller 100 of FIG. 1A including a base 402, a shaft 404 including control buttons 405 (e.g., the control buttons 130, 132, 134 of FIG. 1A), and a pincher 406 including protrusions 408, 410. The description of similar features of FIG. 1A apply to the features of FIG. 4. The example controller 400 of FIG. 4 includes an example lever or trigger 412. In the example of FIG. 4, the trigger 412 is pivotably coupled to an example support 416 coupled to the base 402. During use, the user can push or pull on the trigger 412 to cause the trigger 412 to pivot toward and away from the shaft 404 as represented by arrow 418 of FIG. 4. The user can press the trigger 412 by, for instance, removing his or her fingers from the control buttons 405 and wrapping at least a portion of his or her fingers around the trigger 412. In the example of FIG. 4, the trigger enables additional functions to be provided by the controller while interacting with the VR application, such as squeezing a virtual object. The example controller 400 of FIG. 4 includes an example position sensor 420 to detect movement of the trigger 412 and generate data that is transmitted to the VR interaction manager (FIG. 5) for corresponding manipulation of the virtual object.

FIG. 5 is a block diagram of an example system 500 for manipulating the example virtual object 502 in the example VR environment 504 associated with the example VR application 508 of FIG. 1B using any of the example controllers 100, 300, 400 of FIGS. 1A-4. In the example of FIG. 5, the VR application 506 is implemented by the example user device 507. As mentioned above, the user device 507 can include a personal computer, a headset, goggles, a smartphone, etc. The controller 100, 300, 400 is in communication with the user device 507 via wired or wireless connection(s).

In the example system 500 of FIG. 5, the controller 100, 300, 400 is in communication with an example VR interaction manager 508 via wired or wireless connection(s). In some examples, the example VR interaction manager 508 is implemented by a processor of the controller 100, 300, 400. In some examples, the VR interaction manager 508 is implemented by a processor of the user device 507. The processor of the user device 507 that implements the VR interaction manager 508 may be the same processor that executes the VR application 506 or a different processor. In some examples, the VR interaction manager 508 is implemented by a processor of other user device(s) than the example user device 507 and/or the controller 100, 300, 400. In other examples, the VR interaction manager 508 is implemented by cloud-based device(s), such as server(s), processor(s), and/or virtual machine(s) located remotely from the controller 100, 300, 400. In other examples, some of the analysis performed by the VR interaction manager 508 is implemented by cloud-based devices and other parts of the analysis are implemented by local processor(s) of user device(s) (e.g., the user device 507 of FIG. 5).

The example VR interaction manager 508 includes an example database 510. In some examples, the VR interaction manager 508 includes the database 510. In other examples, the database 510 is located external to the VR interaction manager 508 in a location accessible to the VR interaction manager 508 as shown in FIG. 5. In the example of FIG. 5, the VR interaction manager 508 receives controller position data 512 from the VR position tracker 104, which is stored in the database 510. The controller position data 512 is generated by the sensor of the VR position tracker 104 during operation of the controller 100, 300, 400. The controller position data 512 includes data indicating a position of the controller 100, 300, 400 relative to a coordinate system (e.g., an x-y-z coordinate system) at a current time during operation of the controller 100, 300, 400. In some examples, the VR position tracker 104 transmits the controller position data 512 to the VR interaction manager 508 continuously or substantially continuously during use of the controller 100, 300, 400 to allow the VR interaction manager 508 to detect changes in position of the controller 100, 300, 400 due to user arm, hand, and/or finger movements.

The example VR interaction manager 508 includes an example controller position calculator 514. The controller position calculator 514 calculates a position of the controller 100, 300, 400 relative to the coordinate system based on the controller position data 512. The controller position calculator 514 determines the position of the controller 100, 300, 400 relative to the VR environment 504. Based on the controller position data 512, the controller position calculator 514 determines whether the user is moving the controller 100, 300, 400 proximate to the virtual object 502 or away from the virtual object 502. The controller position calculator 514 can calculate the position of the controller 100, 300, 400 as the controller position data 512 is received (e.g., within milliseconds of receiving the data) to determine a current location of the controller 100, 300, 400 during operation of the controller 100, 300, 400.

In the example of FIG. 5, the VR interaction manager 508 receives pincher position data 516 from the rotational sensor 126 of the pincher 110, which is stored in the database 510. The pincher position data 516 is generated during movement of the protrusions 112, 114, 308, 310 and indicates the angular position of protrusions 112, 114, 308, 310 relative to, for instance, the shaft 106 of the controller 100, 300, 400.

The example VR interaction manager 508 includes an example pincher position detector 518. The pincher position detector 518 analyzes the pincher position data 516 to identify selection of the virtual object 502 by the user via the controller 100, 300, 400, Based on the pincher position data 516 indicating that the angle between the protrusions 112, 114, 308, 310 has decreased, the pincher position detector 518 determines that the user of the controller 100, 300, 400 wishes to grasp the virtual object 502. Similarly, based on the pincher position data 516 indicating that the angle between the protrusions 112, 114, 308, 310 has increased, the pincher position detector 518 determines that the user of the controller 100, 300, 400 wishes to release the virtual object 502. In examples which the VR environment 504 includes more than one virtual object 502 for manipulation by the user, the pincher position detector 518 communicates with the controller position calculator 514 to determine which virtual object 502 the user wishes to engage based on the position of the controller 100, 300, 400 relative to the VR environment 504.

The example VR interaction manager 508 includes an example control button detector 520. In operation, when any of the control buttons 130, 132, 134, 305, 405 of the example controller 100, 300, 400 are activated by the user (e.g., depressed, touched, swiped, etc.), the controller 100, 300, 400 sends respective control input data 522 corresponding to the control buttons 130, 132, 134 that have been activated to the VR interaction manager 508. The control button detector 520 of the example VR interaction manager 508 analyzes the control input data 522 to determine which the control buttons 130, 132, 134 have been activated. The control button detector 520 applies virtual movement rules 524 to determine the corresponding effect of the control input data 522 on the manipulation of the virtual object 502 in the virtual environment 504. The virtual movement rules 524, which can be user defined, are stored in the database 510.

For instance, the virtual movement rules 524 can indicate that when none of the control buttons 130, 132, 134 are activated (e.g., as detected based on an absence of control input data 522 being transmitted by the controller 100, 300, 400 and received by the control button detector 520), movement of the virtual object 502 in the VR environment 504 is free-form, or unrestricted relative to an axis or plane of the x-y-z coordinate system. The virtual movement rules 524 can indicate that when the first control button 130 is selected (e.g., using the user's middle finger 206), the virtual object 502 is to move along the x-axis and not along the y-axis or the z-axis. The virtual movement rules 524 can indicate that when the second control button 132 is selected (e.g., using the user's ring finger 208), the virtual object 502 is to move along the y-axis and not along the x-axis or the z-axis. The virtual movement rules 524 can indicate that when the third control button 134 is selected (e.g., using the user's pinky finger 210), the virtual object 502 is to move along the z-axis and not along the x-axis or the y-axis. The virtual movement rules 524 can indicate that when the first control button 130 and the second control button 132 are selected at the same time, the virtual object 502 is to move within the x-y plane and not another plane defined by the coordinate system. The virtual movement rules 524 can indicate that when the second control button 132 and the third control button 134 are selected at the same time, the virtual object 502 is to move within the y-z plane and not another plane defined by the coordinate system. The virtual movement lilies 524 can indicate that when the first, second, and third control buttons 130, 132, 134 are selected at the same time, movement of the virtual object 502 can be free-form, however with improved precision (e.g., five times precision). The example control button detector 520 identifies the applicable virtual movement rule 524 based on the control input data 522.

The example VR interaction manager 508 includes an example virtual manipulation operator 526, The virtual manipulation operator 526 analyzes inputs received from the controller position calculator 514 with respect to the position of the controller 100, 300, 400; the pincher position detector 518 with respect to the selection (e.g., grasping) of the virtual object 502; and the control button detector 520 with respect to the selection of the control buttons 130, 132, 134 and the corresponding virtual movement rule 524. Based on the analysis of the inputs from the controller position calculator 514, the pincher position detector 518, and the control button detector 520, the virtual manipulation operator 526 determines the range of motion of the virtual object 502 in the virtual environment 504. The virtual manipulation operator 526 generates instructions 528 indicating how the virtual object 502 should be moved in the VR environment 504 and transmits the instructions 528 to the VR application 506 for output.

In examples in which none of the control buttons 130, 132, 134 are selected, the virtual manipulation operator 526 analyzes changes in position of the controller 100, 300, 400 as determined by the controller position calculator 514 and instructs the VR application 506 to output corresponding movement of the virtual object 502 (e.g., for a display via display screen of the user device 507). The virtual manipulation operator 526 executes projection model(s) to render movement of the virtual object 502 in the VR environment 504 based on changes in position of the controller 100, 300, 400 due to user movement.

In examples in which any of the control buttons 130, 132, 134 are selected, the virtual manipulation operator 526 adjusts the controller position data 512 to account for any restrictions or limitations of movement of the virtual object 502 associated with the selection of the control buttons 130, 132, 134 and the corresponding virtual movement rules 524. In particular, the virtual manipulation operator 526 identifies a first, or current, position of the controller 100, 300, 400 when the control button detector 520 receives the control input data 522. Based on the virtual movement rules 524 and projection model(s) the virtual manipulation operator 526 corrects or adjusts the controller position data 512 associated with movement of the controller 100, 300, 400 along axes that are not the selected axis or in planes that are not the selected plane. Correction of the controller position data 512 can include, for instance, discounting or not accounting for the position data associated with the non-selected axes or planes when executing the projection models. In some examples, correction of the controller position data 512 include replacement (e.g., interpolation) of the data associated with the non-selected axes or planes with data corresponding to the selected axis or plane. Based on the adjusted controller position data, the virtual manipulation operator 526 instructs the VR application 506 to move the virtual object from a first position in the VR environment 504 based on the current position of the controller 100, 300, 400 to a second position along the selected axis or within the selected plane. As a result of the analysis performed by the virtual manipulation operator 526, the controller position data associated with movement along the non-selected axis or plane does not affect the resulting movement of the virtual object 502 in the VR environment 504.

For example, if the first control button 130 is selected, the virtual manipulation operator 526 adjusts or corrects the data controller position data 512 associated with movement of the controller 100, 300, 400 along the y-axis and/or the z-axis based on the virtual movement rule 524 indicating that movement of the virtual object 502 should be restricted to movement along the x-axis. The virtual manipulation operator 526 corrects the data by, for instance, discounting or not accounting for the position data associated with the y-axis or the z-axis when executing the projection models. Thus, any controller movement detected by the VR position tracker 104 and appearing in the controller position data 512 as movement along the y-axis or z-axis resulting from, for instance, shaking or wavering of the user's hand while moving the controller 100, 300, 400 does not appear in the movement of the virtual object 502 in the VR environment. Rather, the virtual object 502 appears to move along the x-axis in the VR environment 504 and not along the y-axis or the z-axis based on the instructions generated by the virtual manipulation operator and transmitted to the VR application 506.

As another example, if the third control button 134 is selected, the virtual manipulation operator 526 corrects (e.g., discounts, restricts, replaces) the data controller position data 512 associated with movement of the controller 100, 300, 400 along the x-axis and/or the y-axis based on the virtual movement rule 524 indicating that movement of the virtual object 502 should be restricted to movement along the z-axis. As a result, the virtual object 502 appears to move along the z-axis in the VR environment 504 and not along the x-axis or the y-axis based on the instructions generated by the virtual manipulation operator and transmitted to the VR application 506.

The virtual manipulation operator 526 of FIG. 5 can execute models such as projection models to adjust, restrict, or correct the controller position data 512 associated with axes or planes for which the user does not intend the virtual object 502 to move. As result of the analysis of the controller position data 512 in view of the virtual movement rules 524, the resulting movement of the virtual object 502 in the VR environment 504 is limited to the movement associated with the selected control buttons 130, 132, 134 and the corresponding virtual movement rule 524.

The virtual manipulation operator 526 of the example VR interaction manager 508 continues to adjust or correct the controller position data 512 to account for any restrictions on the movement of the virtual object 502 in response to the receipt of the control button data 522 by the control button detector 520. When no further control button data 522 is received (e.g., indicating that the user is not activating any of the control buttons 130, 132, 134), the virtual manipulation operator 526 refrains from restricting or adjusting the controller position data 512 to allow for free-form movement of the virtual object 502.

As disclosed in connection with the example controller 300 of FIG. 3, in some examples, the controller 100, 300, 400 includes sensors 324 to generate data in response to a twisting movement of the articulating arms 308, 310 of the example controller 300 of FIG. 3. As disclosed in connection with the example controller 400 of FIG. 4, is some examples, the controller 100, 300, 400 includes sensors 420 to generate data in response to movement of the trigger 412 of the example controller 400 of FIG. 4. In these examples, sensor data 530 from any of the sensors 324, 420 associated with features such as the articulating arms 308, 310 and/or the trigger 412 is transmitted to the VR interaction manager 508. This sensor data 530 is analyzed by, for instance, the pincher position detector 518, the control button detector 520, and/or the virtual manipulation operator 526 with respect movement of the virtual object 502, such as rotation of the virtual object 502 in response to the twisting of the arms 308, 310.

In some examples, the VR interaction manager 508 of FIG. 5 receives data from other sensors associated with the controller 100, 300, 400 and/or the user device 507. For example, the user device 507 can include a microphone through which the user can provide voice commands with respect to selection and manipulation of the virtual object 502. The voice commands can include commands to restrict movement of the virtual object 502 along an axis (e.g., saying "x" to restrict movement along the x-axis) or commands to move the virtual object 502 in additional ways than may be provided by the controller 100, 300, 400, such as 360° rotation of the virtual object 507. The voice command data can be analyzed by the VR interaction manager 508 in addition to or in alternative to the controller data based on user settings to control the virtual object 502.

While an example manner of implementing the virtual interaction manager is illustrated in FIG. 5, the element(s), process(es) and/or device(s) illustrated in FIG. 5 may be combined, divided, re-arranged, omitted, eliminated and/or implemented in any other way. Further, the example database 510, the example controller position calculator 514, the example pincher position detector 518, the example control button detector 520, the example virtual manipulator operator 526 and/or, more generally, the example virtual interaction manager 508 of FIG. 5 may be implemented by hardware, software, firmware and/or any combination of hardware, software and/or firmware. Thus, for example, any of the example database 510, the example controller position calculator 514, the example pincher position detector 518, the example control button detector 520, the example virtual manipulator operator 526 and/or, more generally, the example virtual interaction manager 508 could be implemented by analog or digital circuit(s), logic circuit(s), programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example database 510, the example controller position calculator 514, the example pincher position detector 518, the example control button detector 520, the example virtual manipulator operator 526 is/are hereby expressly defined to include a non-transitory computer readable storage device or storage disk such as a memory, a digital versatile disk (DVD), a compact disk (CD), a Blu-ray disk, etc. including the software and/or firmware. Further still, the example virtual interaction manager 508 of FIG. 5 may include element(s), process(es) and/or device(s) in addition to, or instead of, those illustrated in FIG. 5, and/or may include more than one of any or all of the illustrated elements, processes and devices. As used herein, the phrase "in communication," including variations thereof, encompasses direct communication and/or indirect communication through intermediary component(s), and does not require direct physical (e.g., wired) communication and/or constant communication, but rather additionally includes selective communication at periodic intervals, scheduled intervals, aperiodic intervals, and/or one-time events.

Figure 6:
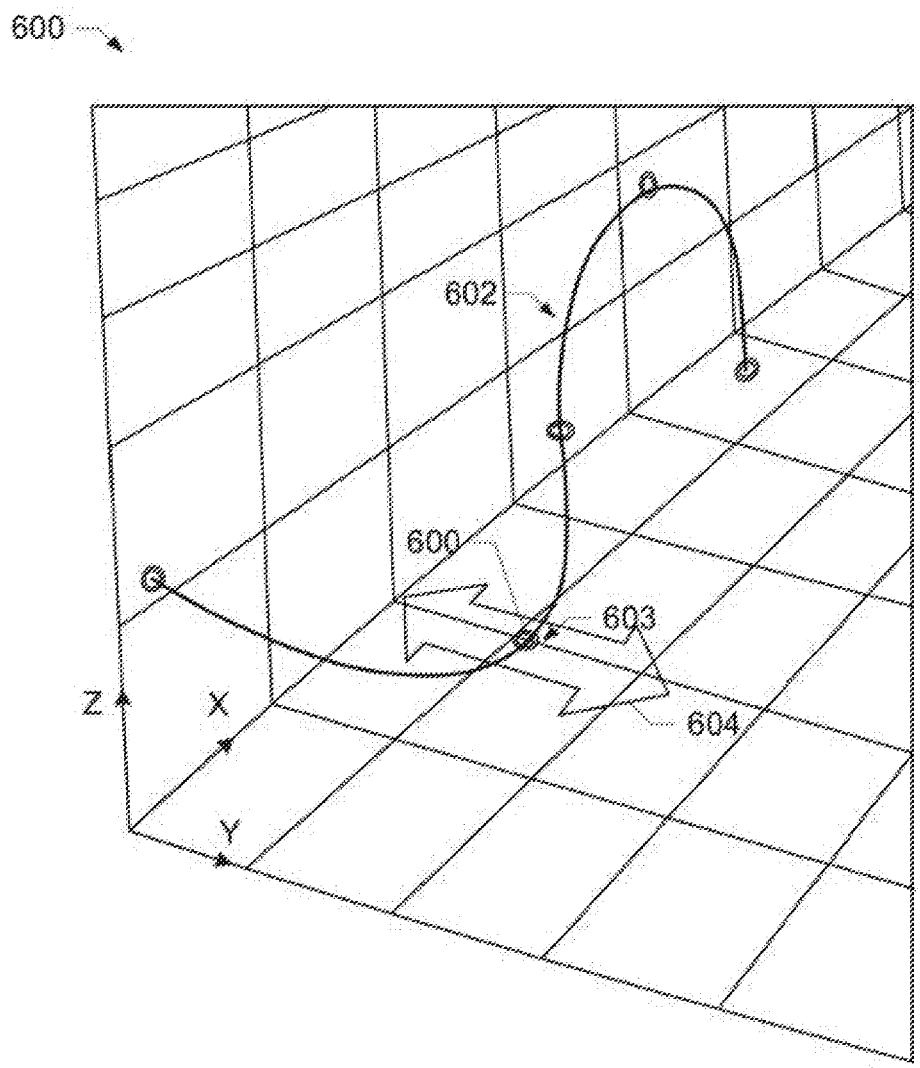
FIG. 6 is a graphical depiction of movement of a virtual object relative to a coordinate system in accordance with teachings of this disclosure.

FIG. 6 is a graphical depiction of example movement of an example virtual object 600 relative to a coordinate system. In FIG. 6, the virtual object 600 moves along a trajectory 602 in the x, y, and/or z-directions based on corresponding movement of the controller 100, 300, 400 by the user. The trajectory 602 can be based on the controller position data 512 generated by the VR position tracker 104 of the controller 100, 300, 400. However, in some examples, the user may wish to move the virtual object 600 along one of the axes or within one of the planes of the coordinate system and not along the other axes or planes. For instance, if the user wishes to restrict movement of the virtual object 600 along the y-axis, the user can select (e.g., depress, touch) the second control button 132 of the controller 100, 300, 400. As result of the activation of the second control button 132, the example VR interaction manager 508 of FIG. 5 adjusts, corrects, or restricts the controller position data 512 associated with controller movement along the x-axis and the z-axis, as disclosed above in connection with FIG. 5. For example, the VR interaction manager 508 detects the position of the controller 100, 300, 400 at location 603 and limits movement of the virtual object 600 from location 603 to movement along the y-axis, as represented by arrow 604 of FIG. 6.

Figure 7:
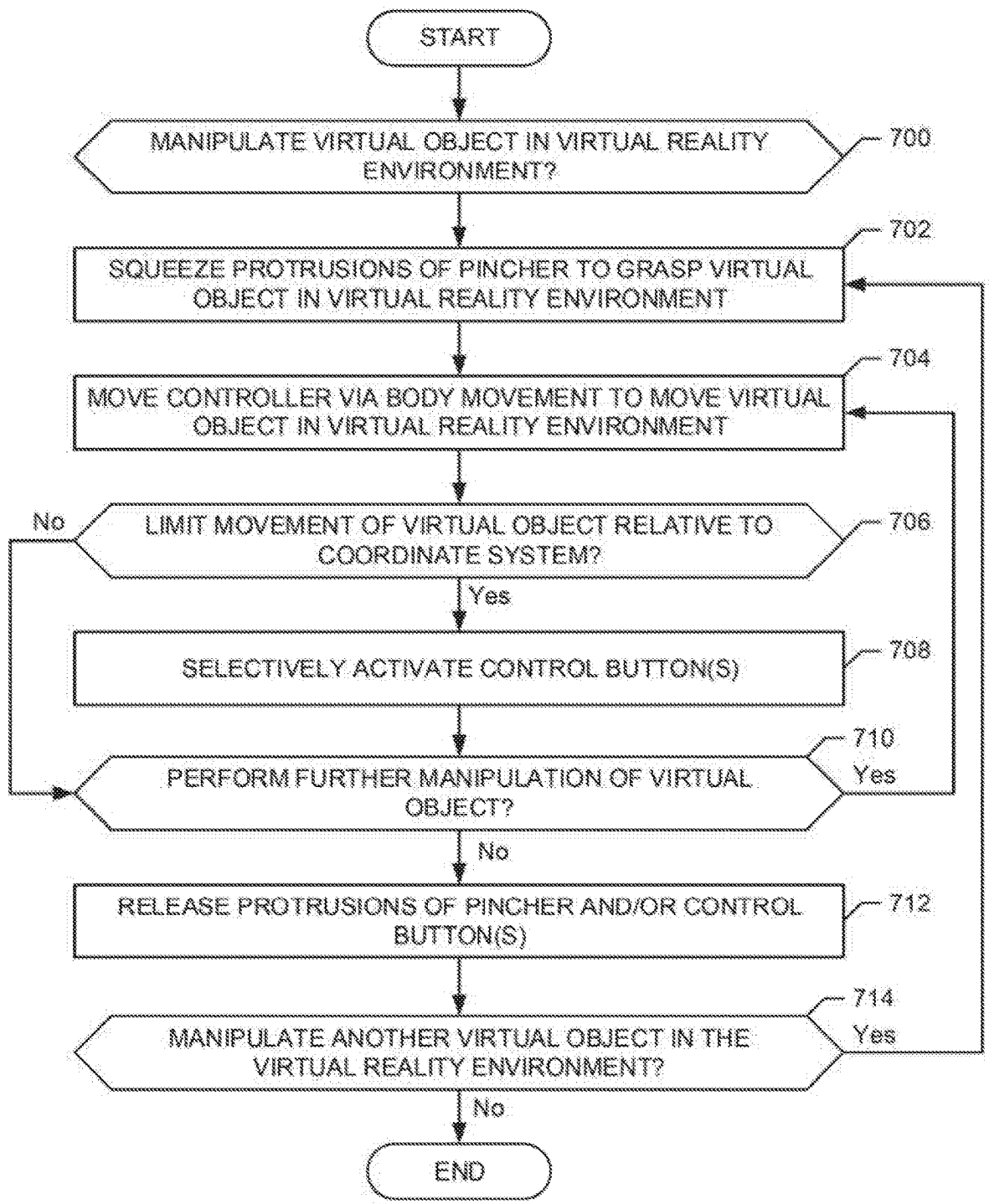
FIG. 7 is flowchart of an example method of use of the example controllers of FIGS. 1A-4 to manipulate a virtual object in a virtual reality environment in accordance with teachings of this disclosure.

FIG. 7 is a flowchart of an example method of use of the VR controller 100, 300, 400 of FIGS. 1A-4 to manipulate a virtual object (e.g., the virtual object 502, 600 of FIGS. 5 and 6) in a VR environment (e.g., the virtual environment 504 of FIG. 5) in accordance with teachings of this disclosure. In the example of FIG. 7, if the user wishes to manipulate the virtual object 502, 600 in the VR environment 504 (block 700), the user squeezes the protrusions 112, 114, 308, 310, 408, 410 of the pincher 110, 306, 406 (block 702). The squeezing of the protrusions 112, 114, 308, 310, 408, 410 of the pincher 110, 306, 406 mimics grasping an object in the real world.

In the example of FIG. 7, the user moves the controller 100, 300, 400 using body movements to move the virtual object 502, 600 in the VR environment 504 (block 704). For example, the user can perform arm and/or hand motions such as raising his or her arm including the hand holding the controller 100, 300, 400; moving his or her hand and, thus, the controller 100, 300, 400, toward and away from his or her body; walking or running with the controller 100, 300, 400 to change positions, etc. In the example of FIG. 7, if the user wishes to limit movement of the virtual object relative to a coordinate system (block 706), the user selectively activates the control button(s) 130, 132, 134 (block 708). For example, if the user wishes to limit movement of the virtual object along the z-axis, the user selects (e.g., depresses, touches), the third control button 134 of the controller 100, 300, 400.

The example method of FIG. 7 includes a decision as to whether the user wishes to perform further manipulation of the virtual object in the virtual reality environment (block 710). In FIG. 7, this decision occurs either after the user selectively activates the control button(s) (block 708) or in examples in which the user does not wish to limit movement of the virtual object relative to the coordinate system (block 706). If the user does wish to perform additional manipulation of the virtual object, the method of FIG. 7 returns to the user moving the controller (block 704). In the example of FIG. 7, when the user does not wish to perform any further manipulation of the virtual object 502, 600 (block 710), the user releases the protrusions 112, 114, 308, 310, 408, 410 of the pincher 110, 306, 406 and/or the activated control buttons 130, 132, 134 (block 712). In the example of FIG. 7, if the user wishes to manipulate another virtual object in the virtual reality environment (block 714), the method of FIG. 7 continues with the user squeezing the protrusions 112, 114, 308, 310, 408, 410 of the pincher 110, 306, 406 to grasp the virtual object (block 702). The example method of FIG. 7 ends when the user no longer wishes to manipulate virtual object(s) in the VR environment (block 714).

Figure 8:
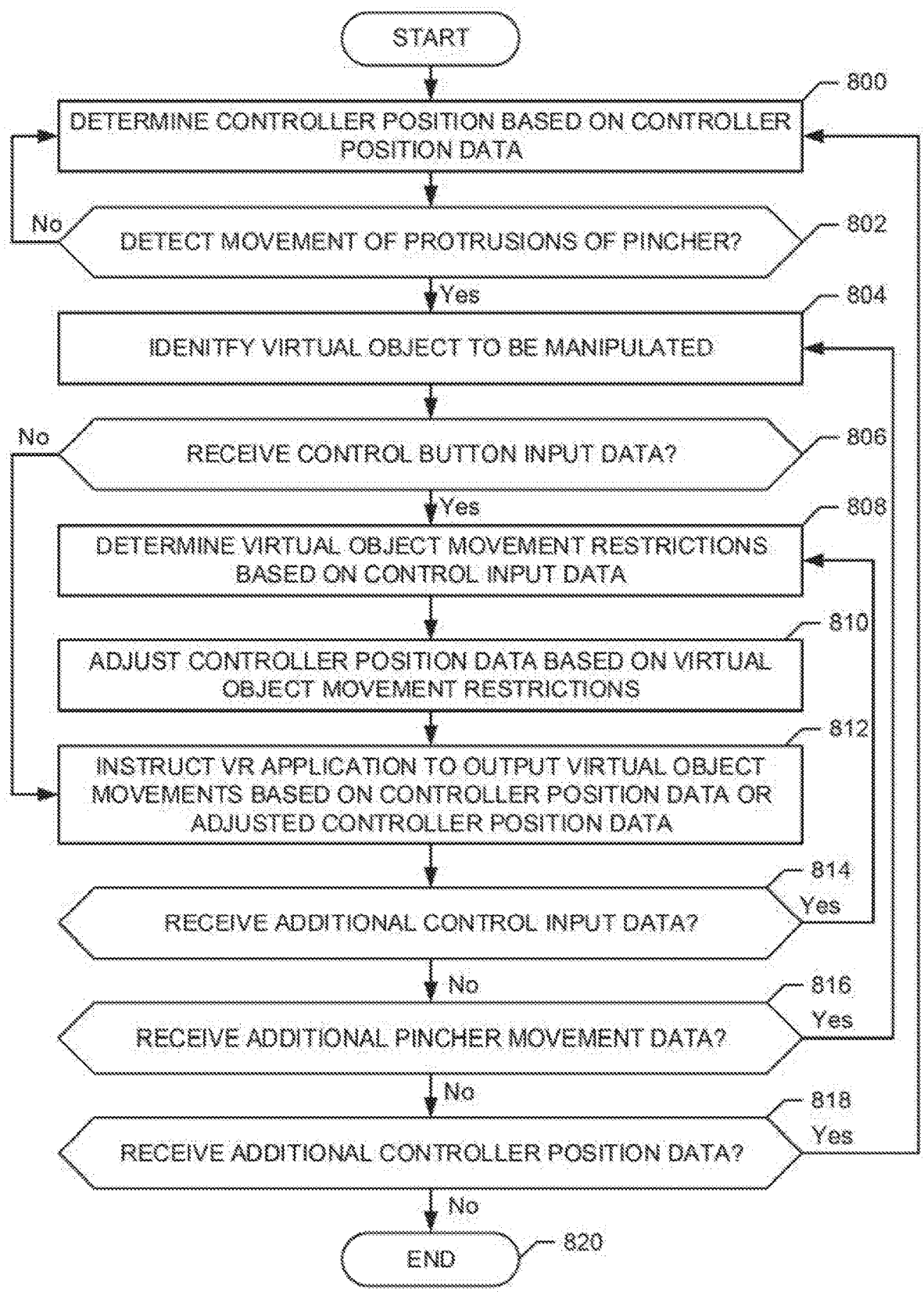
FIG. 8 is a flowchart representative of machine readable instructions that may be executed to implement the example virtual reality interaction manager of FIG. 5.

A flowchart representative of example hardware logic, machine readable instructions, hardware implemented state machines, and/or any combination thereof for implementing the VR interaction manager 508 of FIG. 5 is shown in FIG. 8. The machine readable instructions may be an executable program or portion of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 8, many other methods of implementing the example VR interaction manager 508 may alternatively be used. For example, the order of execution of the blocks may be changed, and/or some of the blocks described may be changed, eliminated, or combined. Additionally or alternatively, any or all of the blocks may be implemented by hardware circuit(s) (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

FIG. 8 is a flowchart representative of example machine readable instructions that may be executed by the VR interaction manager 508 of FIG. 5 to manipulate a virtual object (e.g., the virtual object 502, 600 of FIGS. 5 and 6) in a VR environment (e.g., the VR environment 504 of FIG. 5). The VR environment can be implemented by a VR application (e.g., the VR application 506 of FIG. 5) that is presented to a user via a user device (e.g., the user device 507 of FIG. 5). In the example of FIG. 8, the user interacts with the VR application via a controller (e.g., the controller 100, 300, 400 of FIGS. 1A-4).

In the example of FIG. 8, the controller position calculator 514 of the example VR interaction manager 508 determines a position of the controller 100, 300, 400 based on controller position data 512 (block 800). The controller position data 512 is generated by the VR position tracker 104 of the controller 100, 300, 400 and transmitted to the VR interaction manager 508 via wired or wireless communication protocol(s). The controller position calculator 514 calculates a position of the controller 100, 300, 400 relative to the coordinate system based on the controller position data 512. The controller position calculator 514 calculates the controller position as the data is received from the VR position tracker 104 to track changes in the position of the controller 100, 300, 400.

In some examples of FIG. 8, the pincher position detector 518 of the example VR interaction manager 508 detects movement of the protrusions 112, 114, 308, 310, 408, 410 of the pincher 110, 306, 406 based on pincher position data 514 received from the pincher sensor (s) 126 of the pincher 110, 306, 406 (block 802). In the example of FIG. 8, the pincher position detector 518 determines that the user wishes to grasp the virtual object 502, 600 based on the pincher position data 514 indicating that the angle between the protrusions 112, 114, 308, 310, 408, 410 is decreasing, and, thus, the pincher position detector 518 identifies the virtual object to be manipulated (block 804). In some examples, the pincher position detector 518 communicates with the controller position calculator 514 to determine which virtual object 502, 600 the user wishes to engage in examples which the VR environment 504 includes more than one virtual object 502, 600.

In the example of FIG. 8, if the control button detector 520 of the example VR interaction manager 508 receives control input data 522 from the controller 100, 300, 400 indicating that any of the control buttons 130, 132, 134 have been activated (block 806). The control button detector 520 determines corresponding movement restrictions on the virtual object 502, 600 associated with the activated control buttons 130, 132, 133 (block 808). For example, the control button detector 520 identifies one of the virtual movement rules 524 stored in the database 510, The virtual movement rules 524 define the movement of the virtual object 502, 600 based on particular control buttons selections. For example, the virtual movement rules 524 can indicate that if the first control button 130 is activated, the virtual object 502, 600 should move along the x-axis and not the y-axis or the z-axis.

In the example of FIG. 8, the virtual manipulation operator 526 adjusts the controller position data 512 based on the movement restrictions for the virtual object (block 810). For example, the virtual manipulation operator 526 corrects, replaces, discounts or restricts, etc. the controller position data 512 associated with movement along an axis or within a plane that is not the axis or plane associated with the selected control buttons and corresponding virtual movement rules 524. As an example, if the control input data 522 indicates that the user wishes to restrict movement of the virtual object 502, 600 to the x-axis, the virtual manipulator operator 526 adjusts the controller position data 512 so that the data associated with the y-axis and/or the z-axis is not output by the VR application 506. Rather, the virtual object 502, 600 moves from a first or current position of the virtual object 502, 600 when the control buttons 130, 132, 134 is selected to a second position along the selected axis or within the selected plane.

In examples in which the control input data 512 indicative of activation of any of the control buttons 130, 132, 134 is received, the virtual manipulation operator 526 instructs the VR application to output the movement of the virtual object based on the adjusted controller position data (block 812). In examples in which the control input data 512 is not received indicating that the control buttons 130, 132, 134 have not been selected (block 806), the virtual manipulation operator 526 instructs the VR application to output the movement of the virtual object based on the controller position data (block 812).

The example VR interaction manager 508 of FIG. 5 continues to analyze the control input data (e.g., control input data indicating the user wishes to change the axis or plane along which the virtual object moves), the pincher movement data, and the controller position data as long as data is received from the controller 100, 300, 400 (blocks 814, 816, 818). The example instructions of FIG. 8 end when no additional control input data is received, no additional pincher movement data is received, and no additional controller position data is received (block 820).

Figure 9:
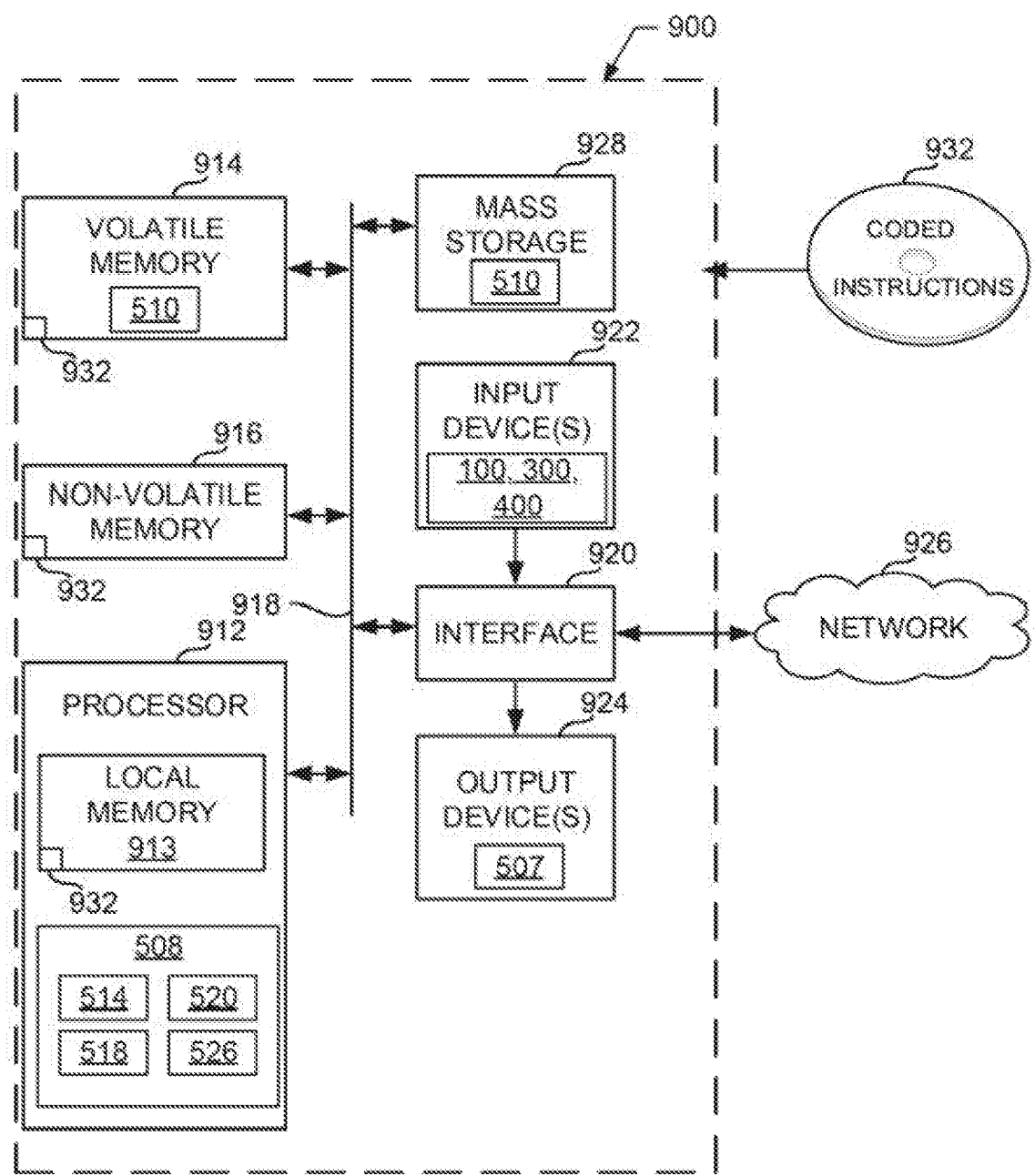
FIG. 9 is an example processor platform that may execute the example instructions of FIG. 8 to implement the example virtual reality interaction manager of FIG. 5.

FIG. 9 is a block diagram of an example processor platform 900 structured to execute the instructions of FIG. 8 to implement the virtual reality interaction manager 508 of FIG. 5. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a headset or other wearable device, or any other type of computing device.

The processor platform 900 of the illustrated example includes a processor 912. The processor 912 of the illustrated example is hardware. For example, the processor 912 can be implemented by integrated circuit(s), logic circuit(s), microprocessor(s), GPU(s), DSP(s), or controller(s) from any desired family or manufacturer. The hardware processor may be a semiconductor based (e.g., silicon based) device. In this example, the processor implements the example virtual reality interaction manager 508, the example controller position calculator 514, the example pincher position detector 518, the example control button detector 520, and the example virtual manipulation operator 526.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, input device(s) 922, 100, 200, 300, 400 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system, and/or element(s) of the controller(s) 100, 200, 300, 400.

Output device(s) 924 are also connected to the interface circuit 920 of the illustrated example. The output devices 924, 507 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, a speaker and/or element(s) of the user device 507. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes mass storage device(s) 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIG. 8 may be stored in the mass storage device 928, in the volatile memory 914, in the non-volatile memory 916, and/or on a removable non-transitory computer readable storage medium such as a CD or DVD.

The example apparatus, methods, and articles of manufacture disclosed herein provide for manipulation of a virtual object in a virtual reality environment with increased control and precision as compared to known VR controllers that are based on gaming consoles. Example controllers disclosed herein include a pincher or claw that allows a user to more naturally mimic the motions of grasping an object while interacting with a VR application. Example controllers disclosed herein include control buttons that can be selectively activated to restrict or limit movement of the virtual object along axis or within a plane of a coordinate system. In providing for controlled movement of the virtual object, examples disclosed herein eliminate the effects of unintended and/or uncontrolled user movements while holding the controller, such as hand shaking or wavering, from affecting resulting movement of the virtual object in the VR environment.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

An example controller for use with a virtual reality device implementing a virtual reality environment includes a base and a shaft supported by the base. The shaft includes a first control button associated with a first axis of a coordinate plane. The first control button is in communication with the virtual reality device. Activation of the first control button is to cause restriction of movement a virtual object in the virtual reality environment relative to the first axis. The shaft includes a second control button associated with a second axis of the coordinate plane. The second control button is in communication with the virtual reality device. Activation of the second control button is to cause restriction of movement of the virtual object in the virtual reality environment relative to the second axis.

In some examples, the controller further includes a third control button. In such examples, activation of the third control button is to cause restriction of movement of the virtual object in the virtual reality environment relative to a third axis.

In some examples, the first control button and the second control button are arranged about the shaft for simultaneous access by a user.

In some examples, the controller further includes a first protrusion coupled to the shaft and a second protrusion coupled to the shaft. In such examples, rotation of the first protrusion and the second protrusion relative to the shaft is to cause selection of the virtual object in the virtual reality environment. In some such examples, the first protrusion, the second protrusion, the first control button, and the second control button are arranged for simultaneous access by respective fingers of a hand of a user.

An example apparatus includes a controller for manipulating a virtual object in a virtual reality environment. The controller includes a controller position tracker, a first control button, and a second control button. The controller position tracker is to generate controller position data during movement of the controller by a user. The example apparatus includes a processor in communication with the controller. The processor is to adjust the controller position data to restrict movement of the virtual object in the virtual reality environment relative to an axis of a coordinate system based on activation of the first control button, the second control button, or both the first and second control buttons.

In some examples, the processor is to restrict movement of the virtual object in the virtual reality environment relative to a plane defined by the coordinate system based on activation of the first and second control buttons.

In some examples, the controller includes a pincher and sensor generate pincher data. The processor is to detect selection of the virtual object via the controller based on the pincher data.

In some examples, the axis is a first axis and the processor is to adjust the controller position data by discounting the controller position data associated with a second axis of the coordinate system.

An example controller for use with a virtual reality device implementing a virtual reality environment includes a base and a shaft supported by the base. The shaft includes a plurality of control buttons. The example controller includes a first protrusion and a second protrusion rotatably coupled to the shaft. The example controller includes a sensor to detect an angular position of the first protrusion and the second protrusion relative to the shaft. The sensor is in communication with the virtual reality device and the plurality of control buttons in communication with the virtual reality device for controlling a position of a virtual object in the virtual reality environment.

In some examples, the plurality of control buttons are arranged along a longitudinal axis of the shaft.

In some examples, the first protrusion and the second protrusion are biased by a spring. In such examples, the first protrusion is spaced part from the second protrusion via the spring.

In some examples, the first protrusion includes an articulating joint.

In some examples, the controller further includes a position tracker coupled to the base.

In some examples, the controller further includes a lever pivotably coupled to the shaft.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A controller for use with a virtual reality device implementing a virtual reality environment, the controller comprising:
    a base;
    a shaft supported by the base, the shaft including:
        a first control button associated with a first axis of a coordinate plane, the first control button being in communication with the virtual reality device, wherein activation of the first control button is to cause restriction of movement a virtual object in the virtual reality environment relative to the first axis; and
        a second control button associated with a second axis of the coordinate plane, the second control button being in communication with the virtual reality device, wherein activation of the second control button is to cause restriction of movement of the virtual object in the virtual reality environment relative to the second axis;
    a first protrusion coupled to the shaft; and
    a second protrusion coupled to the shaft, rotation of the first protrusion and the second protrusion relative to the shaft to cause selection of the virtual object in the virtual reality environment, the first protrusion, the second protrusion, the first control button, and the second control button arranged for simultaneous access by respective fingers of a hand of a user.

2. The controller of claim 1, further including a third control button, wherein activation of the third control button is to cause restriction of movement of the virtual object in the virtual reality environment relative to a third axis.

3. The controller of claim 1, wherein the first control button and the second control button are arranged along a longitudinal axis of the shaft.

4. The controller of claim 1, wherein the first protrusion and the second protrusion are biased by a spring, the first protrusion spaced apart from the second protrusion via the spring.

5. The controller of claim 1, wherein the first protrusion includes an articulating joint.

6. The controller of claim 1, further including a position tracker coupled to the base.

7. The controller of claim 1, further including a lever pivotably coupled to the shaft.

8. The controller of claim 1, further including a sensor to detect an angular position of the first protrusion and the second protrusion relative to the shaft.

9. An apparatus comprising:
    a controller for manipulating a virtual object in a virtual reality environment, the controller including:
        a controller position tracker, the controller position tracker to generate controller position data during movement of the controller by a user;
        a first control button;
        a second control button;
        a shaft; and
        a pincher coupled to the shaft, the pincher including a first protrusion rotatably coupled to the shaft and a second protrusion rotatably coupled to the shaft, respective ends of the first protrusion and the second protrusion rotatable toward and away from each other; and
    a processor in communication with the controller, the processor to adjust the controller position data to restrict movement of the virtual object in the virtual reality environment relative to an axis of a coordinate system based on activation of the first control button, the second control button, or both the first and second control buttons.

10. The apparatus of claim 9, wherein the processor is to restrict movement of the virtual object in the virtual reality environment relative to a plane defined by the coordinate system based on activation of the first and second control buttons.

11. The apparatus of claim 9, wherein the controller includes a sensor to generate pincher data in response to rotation of the first protrusion and the second protrusion, the processor to detect selection of the virtual object via the controller based on the pincher data.

12. The apparatus of claim 9, wherein the axis is a first axis and the processor is to adjust the controller position data by discounting the controller position data associated with a second axis of the coordinate system.

13. The apparatus of claim 9, wherein the first control button and the second control button are carried by a portion of the shaft, a longitudinal axis passing through the portion of the shaft disposed between the first protrusion and the second protrusion.

14. The apparatus of claim 9, further including a third control button, wherein the first control button, the second control button, the third control button, the first protrusion, and the second protrusion are arranged about the shaft for simultaneous access by the user.

15. The apparatus of claim 14, wherein the axis is a first axis and the processor to adjust the controller position data to restrict movement of the virtual object in the virtual reality environment relative to a second axis of the coordinate system based on activation of the second control button.

* * * * *